US008355176B2

(12) United States Patent  
Toura (10) Patent No.: US 8,355,176 B2  
(45) Date of Patent: Jan. 15, 2013

(54) IMAGE PROCESSING APPARATUS AND IMAGE PROCESSING METHOD FOR HALFTONING SCREEN PROCESSING

(75) Inventor: Kosuke Toura, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1351 days.

(21) Appl. No.: 11/698,907

(22) Filed: Jan. 29, 2007

(65) Prior Publication Data

US 2008/0018940 A1     Jan. 24, 2008

(30) Foreign Application Priority Data

Jul. 12, 2006  (JP) ................................. 2006-191757

(51) Int. Cl.
- *G06K 15/00* (2006.01)
- *G06K 9/00* (2006.01)
- *G09G 5/02* (2006.01)

(52) U.S. Cl. ...... 358/3.13; 358/1.9; 358/3.06; 358/3.07; 358/3.08; 358/3.2; 358/534; 358/536; 382/251; 382/252; 382/237; 345/596; 345/616; 345/63; 345/72; 345/89

(58) Field of Classification Search .................. 358/3.13, 358/1.9, 2.1, 3.06, 3.07, 3.08, 3.2, 3.22, 534, 358/536; 382/209, 251, 252, 212; 345/596, 345/626, 563

See application file for complete search history.

(56) References Cited

U.S. PATENT DOCUMENTS

| | | | | |
|---|---|---|---|---|
| 5,107,349 A * | 4/1992 | Ng et al. | ...... | 358/2.99 |
| 5,832,122 A * | 11/1998 | Shimazaki | ...... | 382/237 |
| 7,002,622 B2 * | 2/2006 | Tanaka et al. | ...... | 348/222.1 |
| 7,199,897 B2 * | 4/2007 | Nomizu | ...... | 358/1.18 |
| 7,251,060 B2 * | 7/2007 | Tonami et al. | ...... | 358/3.16 |
| 2007/0242290 A1 * | 10/2007 | Misaizu et al. | ...... | 358/1.9 |

FOREIGN PATENT DOCUMENTS

| | | |
|---|---|---|
| JP | 5-199406 | 8/1993 |
| JP | 9-107473 | 4/1997 |
| JP | 9-284553 | 10/1997 |

OTHER PUBLICATIONS

Japanese Office Action dated Jan. 22, 2008.

* cited by examiner

*Primary Examiner* — Steven Kau (74) *Attorney, Agent, or Firm* — Finnegan, Henderson, Farabow, Garrett & Dunner, L.L.P.

(57) ABSTRACT

Disclosed herein is an image processing apparatus including: a screen processor for determining each pixel value of a screen processing application unit region composed of a plurality of pixels to which a threshold matrix is applied, in an inputted image; and for carrying out a screen processing by applying one threshold matrix among a plurality of threshold matrices in which applied positions of the threshold values are different from each other, to the plurality of pixels in the screen processing application unit region based on each determined pixel value.

6 Claims, 8 Drawing Sheets

THRESHOLD VALUE < NUMBER > : 0 < 1 >
85 < 2 >
170 < 3 >

| < NUMBER > | < 3 > | < 2 > | < 1 > |
|---|---|---|---|
| INPUT PIXEL (PIXEL VALUE) | 0 | 0 | 160 |

| < NUMBER > | < 3 > | < 2 > | < 1 > |
|---|---|---|---|
| MATRIX (THRESHOLD VALUE) | 170 | 85 | 0 |

| < NUMBER > | < 3 > | < 2 > | < 1 > |
|---|---|---|---|
| OUTPUT PIXEL (PIXEL VALUE) | 0 | 0 | 1 |

*FIG.8*

IMAGE PROCESSING APPARATUS AND IMAGE PROCESSING METHOD FOR HALFTONING SCREEN PROCESSING

BACKGROUND OF THE INVENTION

1. Field of the Invention

The present invention relates to an image processing apparatus, an image processing method, and a computer-readable recording medium for carrying out a screen processing for an inputted image by applying a threshold matrix to the inputted image.

2. Description of Related Art

A screen processing is a processing in which a threshold matrix in which different threshold values are set in a matrix manner (hereinafter simply referred to as matrix), is used to carry out binary (or multilevel) operation for a multilevel image data and to reproduce a halftone. Conventionally, various methods for improving a gradation characteristic have been suggested. One of such methods is a method for reproducing a halftone depending on the density of an inputted image. For example, there is a conventional method in which a matrix size can be changed depending on the change of the density of an inputted image to set threshold values in the matrix having the changed size (see Japanese Patent Unexamined Publication No. 5-199406 for example). According to this method, in parts of an image in which the density change is small, the matrix size is expanded and the same threshold values are applied in order to improve the processing efficiency, and in parts of an image in which the density change is large, the matrix size is reduced and different threshold values are applied in order to improve the gradation characteristic.

There is another method in which a matrix to be applied is changed depending on the density of an inputted image (for example, see Japanese Patent Unexamined Publication No. 9-107473). According to this method, in case of high density, a matrix in which threshold values are arranged in a whorl-like manner so that threshold values are increased from the center of the matrix is used, and in case of low density, a matrix in which the above arranged threshold values are inverted is used. In the method, it is possible to reproduce a halftone depending on the change in the density of an inputted image by a simple matrix.

However, in a conventional screen processing, when the matrix in which the applied positions of the threshold values are fixed is used, some arrays of the pixel values of an inputted image may cause deteriorated reproducibility of a thin line having a width of one to several pixels.

Figure 7:
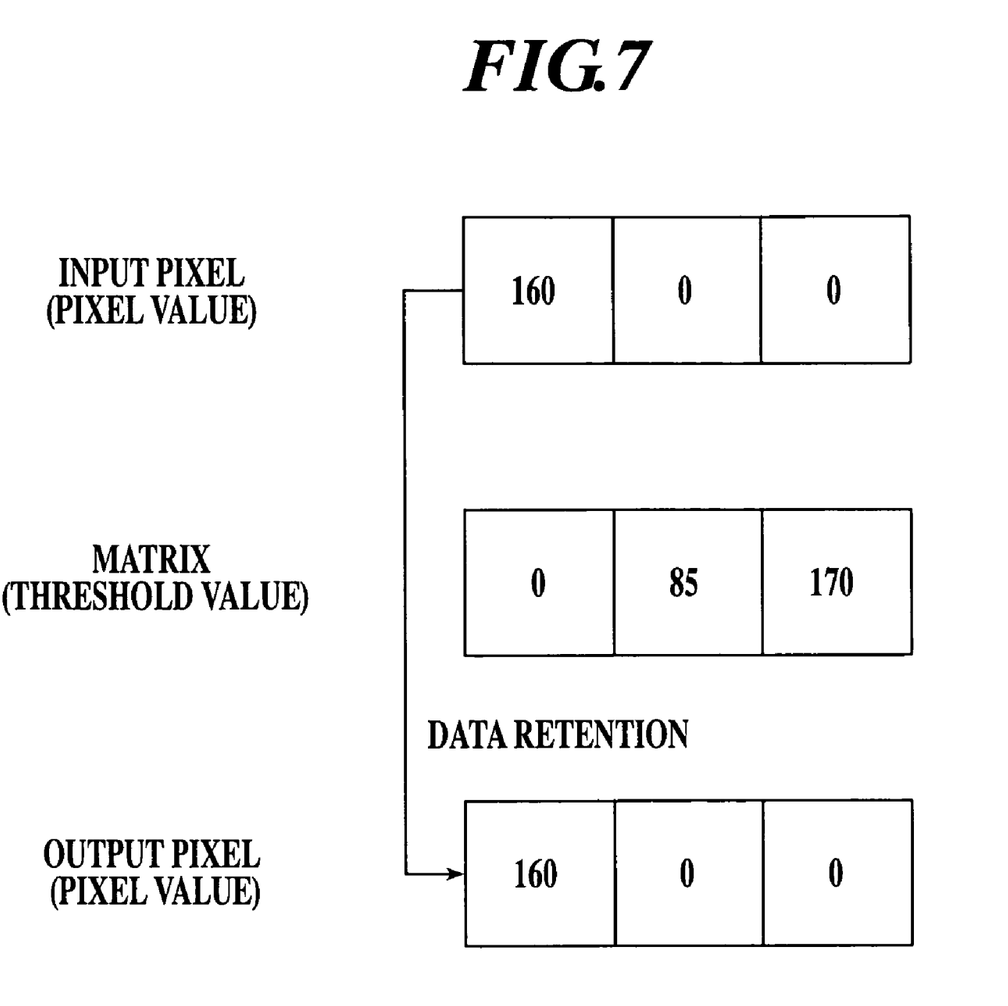
FIG. 7 is a view for explaining a conventional screen processing and the output result thereof.

For example, as shown in FIG. 7, the case where a 3 pixels×1 pixel matrix having an array of threshold values of (0, 85, 170) is applied to an inputted image having a pixel value array (160, 0, 0) in order to obtain a multilevel image, is considered. In this case, when "the pixel value>the threshold value" is established, the pixel value is directly outputted as an output value. When "the pixel value≦the threshold value" is established, an output value of "0" is outputted. In the case of the inputted image shown in FIG. 7, a threshold value of "0" which is smaller than a pixel value of "160" is applied to the pixel value of "160" and thus the output value is "160". Thus, no problem is caused because the inputted image is directly reproduced even when the matrix is applied to the pixel value.

Figure 8:
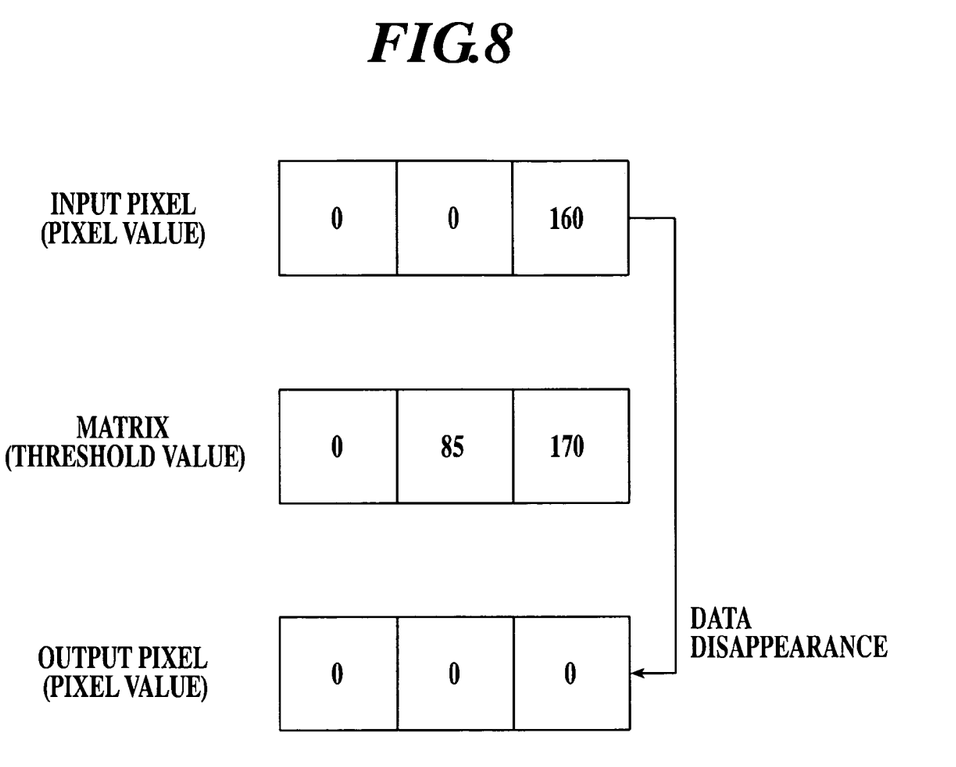
FIG. 8 is a view for explaining a conventional screen processing and the output result thereof.

On the other hand, another case where the same matrix is applied to an inputted image having a pixel value array of (0, 0, 160), is considered. In this case, a threshold value of "170" is applied to a pixel value of "160" as shown in FIG. 8. As a result, an output value is "0" and data of "160" of the inputted image is lost. This causes an outputted thin line including a thin spot or the like. As a result, the reproducibility of the inputted image is deteriorated.

SUMMARY

An object of the present invention is to improve the reproducibility of an inputted image.

To achieve at least one of the above-described objects, an image processing apparatus reflecting one aspect of the invention, comprises:

a screen processor for determining each pixel value of a screen processing application unit region composed of a plurality of pixels to which a threshold matrix is applied, in an inputted image; and for carrying out a screen processing by applying one threshold matrix among a plurality of threshold matrices in which applied positions of the threshold values are different from each other, to the plurality of pixels in the screen processing application unit region based on each determined pixel value.

An image processing method reflecting one aspect of the invention, comprises:

determining each pixel value of a screen processing application unit region composed of a plurality of pixels to which a threshold matrix is applied, in an inputted image; and carrying out a screen processing by applying one threshold matrix among a plurality of threshold matrices in which applied positions of the threshold values are different from each other, to the plurality of pixels in the screen processing application unit region based on each determined pixel value.

A computer-readable recording medium reflecting one aspect of the invention, wherein a program causes a computer to function as:

a screen processor for determining each pixel value of a screen processing application unit region composed of a plurality of pixels to which a threshold matrix is applied, in an inputted image; and for carrying out a screen processing by applying one threshold matrix among a plurality of threshold matrices in which applied positions of the threshold values are different from each other, to the plurality of pixels in the screen processing application unit region based on each determined pixel value.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

DETAILED DESCRIPTION OF THE PREFERRED EMBODIMENT

Hereinafter, embodiments according to an image processing apparatus, an image processing method, and a recording medium of the present invention will be described with reference to the drawings.

First, the structure will be described.

Figure 1:
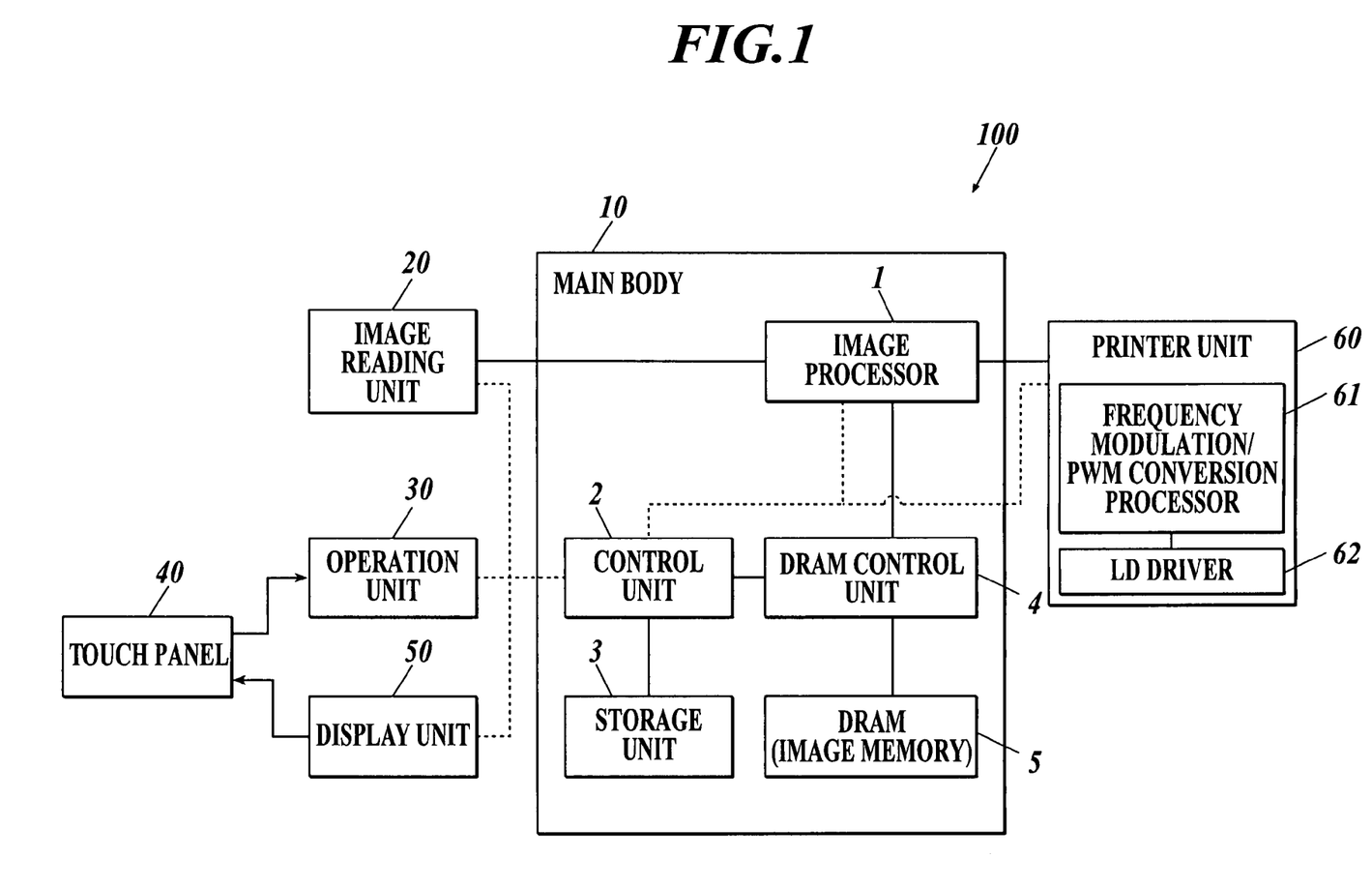
FIG. 1 is a view showing an internal structure of an image processing apparatus in this embodiment.

FIG. 1 illustrates an internal structure of an image processing apparatus 100 in this embodiment.

As shown in FIG. 1, the image processing apparatus 100 comprises a main body 10, an image reading unit 20, an operation unit 30, a touch panel 40, a display unit 50, and a printer unit 60. The main body 10 comprises an image processor 1, a control unit 2, a storage unit 3, a dynamic random access memory (DRAM) control unit 4, a DRAM 5 and the like.

The image reading unit 20 comprises a light source, a charge coupled device (CCD), an A/D converter and the like. When the image reading unit 20 reads an image, a document is irradiated with light from the light source to scan the document and the light is reflected. An image is formed by the reflected light. A document image is read by carrying out a photoelectric conversion for the image with the CCD to generate an image signal (analog signal). Then, the image signal is converted to digital image data by an A/D converter and the converted data is outputted to the image processor 1 of the main body 10. The term "image" herein includes not only an image of a figure or photograph or the like but also a character image, such as image of letters and marks, or the like.

In the image reading unit 20, an image is separated from each color of red (R), green (G), and blue (B) to output each color image data. Each type of processing, such as a processing for correcting brightness variation, a processing for correcting a brightness characteristic, a variable power processing, a γ conversion processing (a processing for converting a brightness-linear characteristic to a density-linear characteristic), a color correction processing or the like, is carried out for each color image data by a correction processor (not shown) provided between the image reading unit 20 and the image processor 1. Then, the color image data is inputted to the image processor 1.

The operation unit 30 comprises various function keys (e.g., a start key for instructing the start of a printing operation, a numeric key and the like). When these function keys and the touch panel 40 are operated, the operation unit 30 outputs a corresponding operation signal to the control unit 2.

The display unit 50 comprises a liquid crystal display (LCD) integrated with the touch panel 40 to display various operation screens for operating a printing operation, on the LCD.

Figure 2:
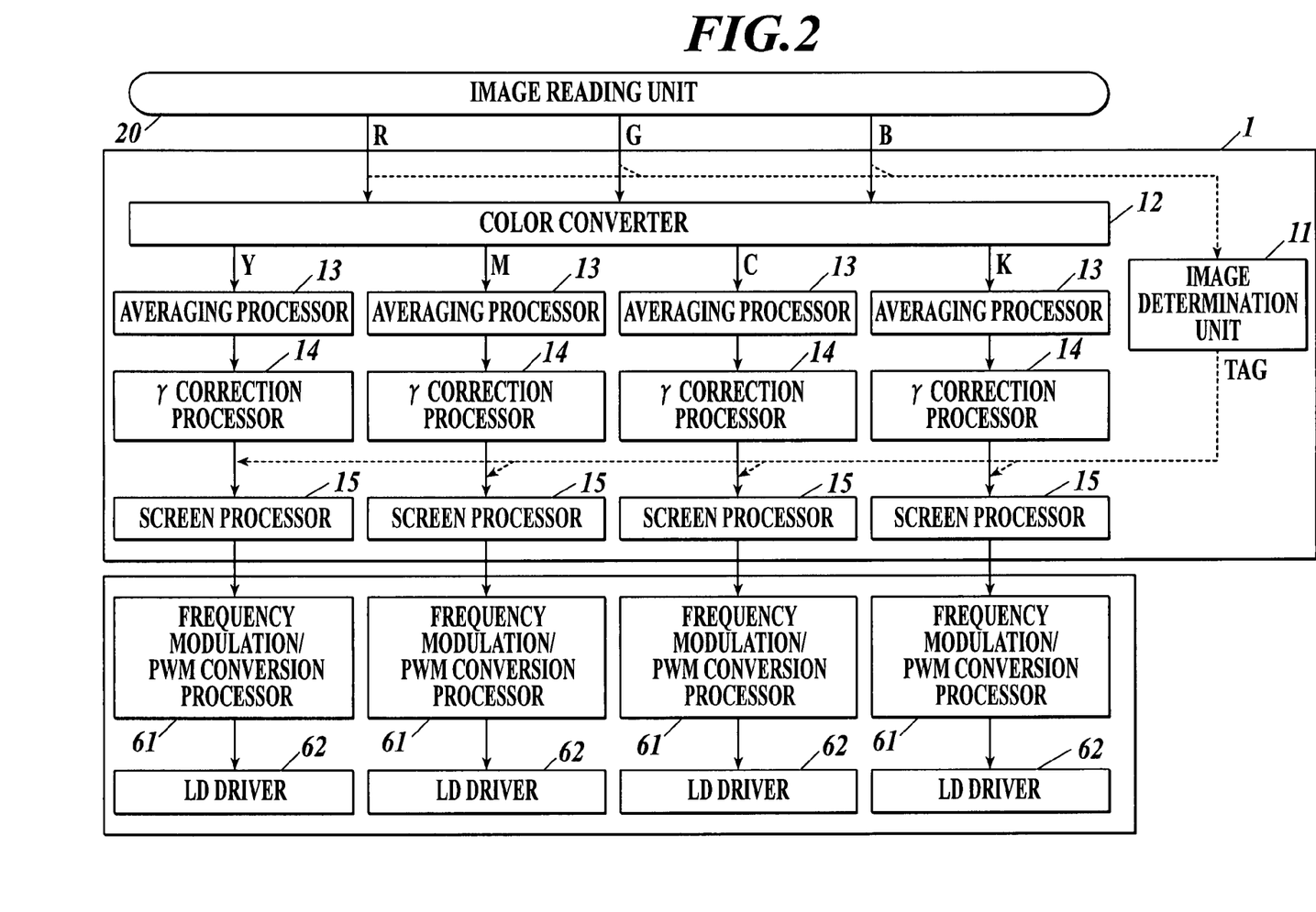
FIG. 2 is a view showing an image processor and a printer unit of FIG. 1.

The printer unit 60 prints the image by the electrophotographic method based on the image data inputted from the image processor 1 of the main body 10. In the electrophotographic method, a photoconductive drum is irradiated with laser light from a laser light source to carry out the expose. Thereby, an electrostatic latent image is formed. A toner image which is obtained by injecting the toner from a development unit to the electrostatic latent image, is transferred onto a recording paper to form an image. In this embodiment, four color materials of yellow (Y), magenta (M), cyan (C), and black (K) are used to print an image. When each color image data is inputted to the printer unit 60, the printer unit 60 carries out a frequency modulation and a pulse width modulation (PWM) conversion by using a frequency modulation/PWM conversion processor 61 for the image data and inputs a modification signal to an LD driver 62. Based on the inputted modification signal, the LD driver 62 actuates the laser light source to control laser light emitted from the laser light source, that is, light exposure.

Next, the each section of the main body 10 will be described.

In accordance with various control programs stored in the storage unit 3, such as a system program, a print processing program and the like, the control unit 2 controls the operations of each section of the image processing apparatus 100 in a concentrated manner.

The storage unit 3 stores various control programs executed by the control unit 2 and parameters and data and the like, required for the each section. For example, the storage unit 3 stores data for a matrix to be used in a screen processing by the image processor 1.

The DRAM control unit 4 controls an input and an output of image data stored in the DRAM 5. The DRAM 5 is an image memory for storing image data.

Next, the image processor 1 according to the present invention will be described.

As shown in FIG. 2, the image processor 1 comprises an image determination unit 11, a color converter 12, an averaging processor 13, a γ correction processor 14, and a screen processor 15 and the like. The averaging processor 13, the γ correction processor 14, and the screen processor 15 are provided for each color of Y, M, C, and K.

The image determination unit 11 analyzes the inputted image data read by the image reading unit 20 in order to determine whether each pixel has an attribute of a character image, a line image, or a photographic image. Then, the image determination unit 11 generates an attribute data TAG showing the determination result for each pixel and outputs the attribute data TAG to the screen processor 15. When the attribute is a character attribute, the TAG is set to 0. When the attribute is a line image attribute, the TAG is set to 1. When the attribute is a photographic image attribute, the TAG is set to 2.

The color converter 12 carries out a color correction for each color image data of R, G, and B inputted from the image reading unit 20. Then, the color converter 12 converts the image data to each color image data having each color material of Y, M, C, and K, which can be outputted from the image processing apparatus 100. Each image data of Y, M, C, and K, which is generated by the color conversion is outputted to the averaging processor 13.

The averaging processor 13 carries out an averaging processing for the inputted image data. Each image data having each color material, for which the averaging processing is carried out, is outputted to the corresponding γ correction processor.

The γ correction processor 14 carries out a gradation processing for the inputted image data by using a lookup table (LUT) previously prepared for γ correction in order to carry out a γ correction processing. Each image data having each color material, for which the γ correction processing, is outputted to the corresponding screen processors 15.

The screen processor 15 carries out a screen processing for the inputted image data (hereinafter referred to as inputted image) by the dither method. In the screen processing, a matrix in which different threshold values are previously set, is read out from the storage unit 3 and is applied to the inputted image to carry out a binary or multilevel operation. In this embodiment, a case in which a screen processing for carrying out the multilevel operation for the image, is realized by a software processing, will be explained.

Figure 3:
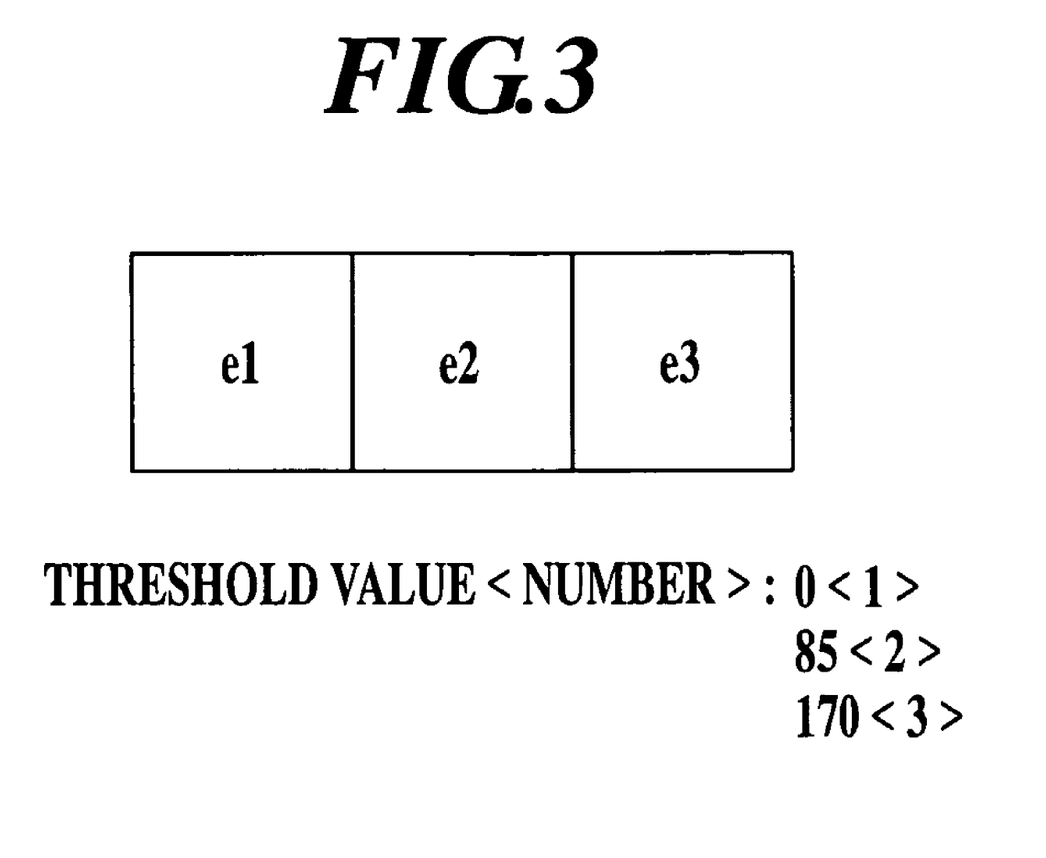
FIG. 3 is a view showing an example of a threshold matrix.

FIG. 3 illustrates an example of a matrix.

A matrix is composed of a plurality of elements which are called cells (one cell corresponds to one pixel). In the cells, different threshold values TH are set, respectively. The matrix shown in FIG. 3 is composed of 1×3 cells e1 to e3. The cells e1 to e3 are set to three threshold values (0, 85, 170). Each application number is set to each threshold value in ascending order of the threshold values. Specifically, an application number "2" is set to the smallest threshold value of "0", an application number "1" is set to a threshold value "85", and an application number "3" is set to a threshold value "170".

The screen processor 15 scans the matrix as described above in a main scanning direction and a sub scanning direction of the inputted image to compare a pixel group corresponding to the matrix with threshold values in the matrix. Then, the multilevel operation is carried out.

Hereinafter, the flow of the processing in the screen processor 15 will be explained with reference to FIG. 4.

Figure 4:
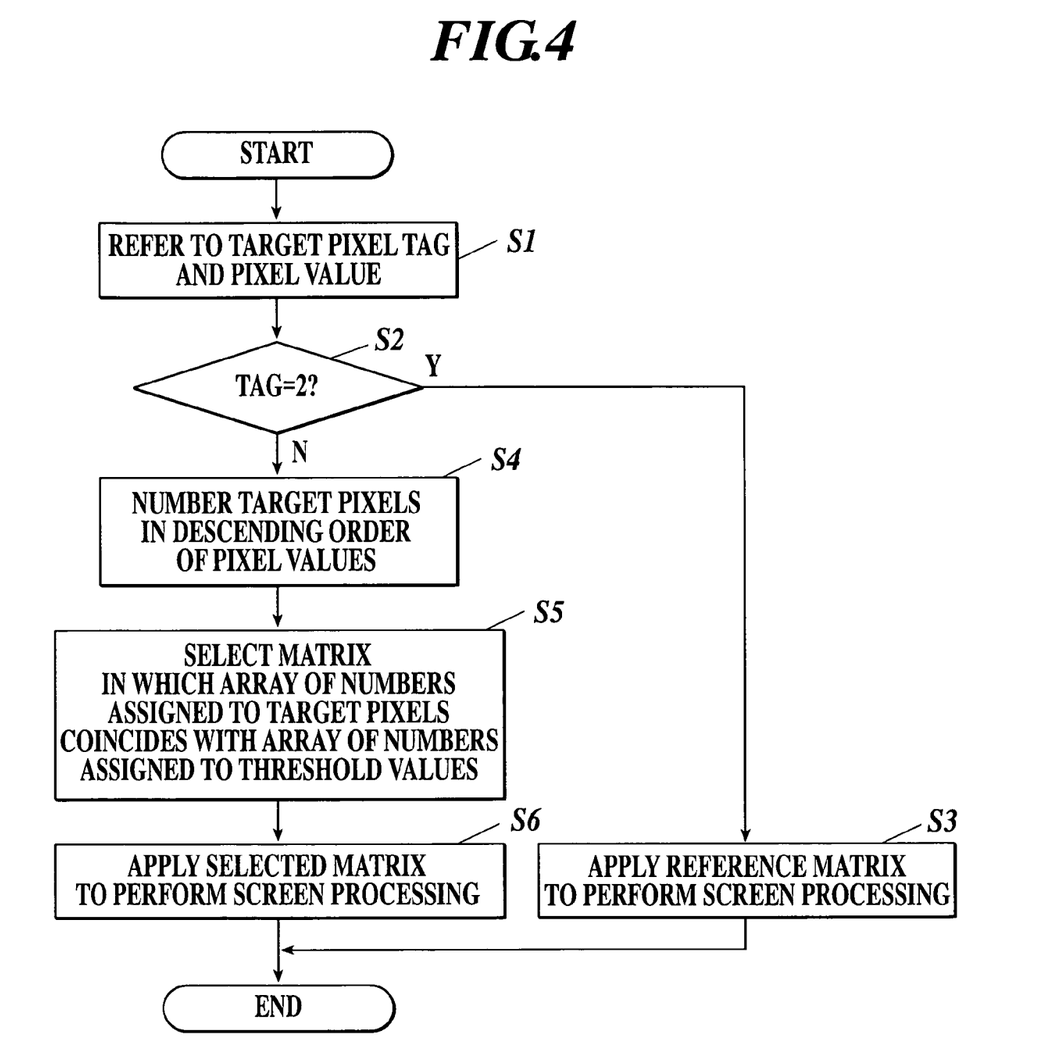
FIG. 4 is a flowchart showing the flow of the processing in a screen processor.

As shown in FIG. 4, in an inputted image, with respect to a pixel group in which the matrix is applied to each pixel (hereinafter referred to as a target pixel), the screen processor 15 firstly refers to the attribute data TAG and refers to the pixel value of each target pixel (Step S1). In case of the matrix shown in FIG. 3, which is composed of 1×3 cells, the screen processor 15 refers to pixel values of 3 pixels corresponding to the matrix applied to the inputted image.

Next, the screen processor 15 determines whether the TAG of the target pixel group is "2" or not (Step S2). In case of TAG=2 (Step S2; Y), i.e., when the target pixel group constitutes a photographic image, the screen processor 15 reads the matrix corresponding to the photographic image from the storage unit 3. The matrix corresponding to the photographic image may be a matrix that is exclusively prepared for the photographic image and that is stored in the storage unit 3 or may be a predetermined matrix among a plurality of matrices stored in the storage unit 3. Then, the matrix is applied to the target pixel group to perform a screen processing (Step S3). Specifically, pixel values of the target pixels at corresponding positions in the applied matrix are compared with threshold values. In case of "pixel values>threshold values", the pixel values are directly outputted as an output value. In case of "pixel values≦threshold values", an output value "0" is outputted and a multilevel operation is performed.

Figure 5:
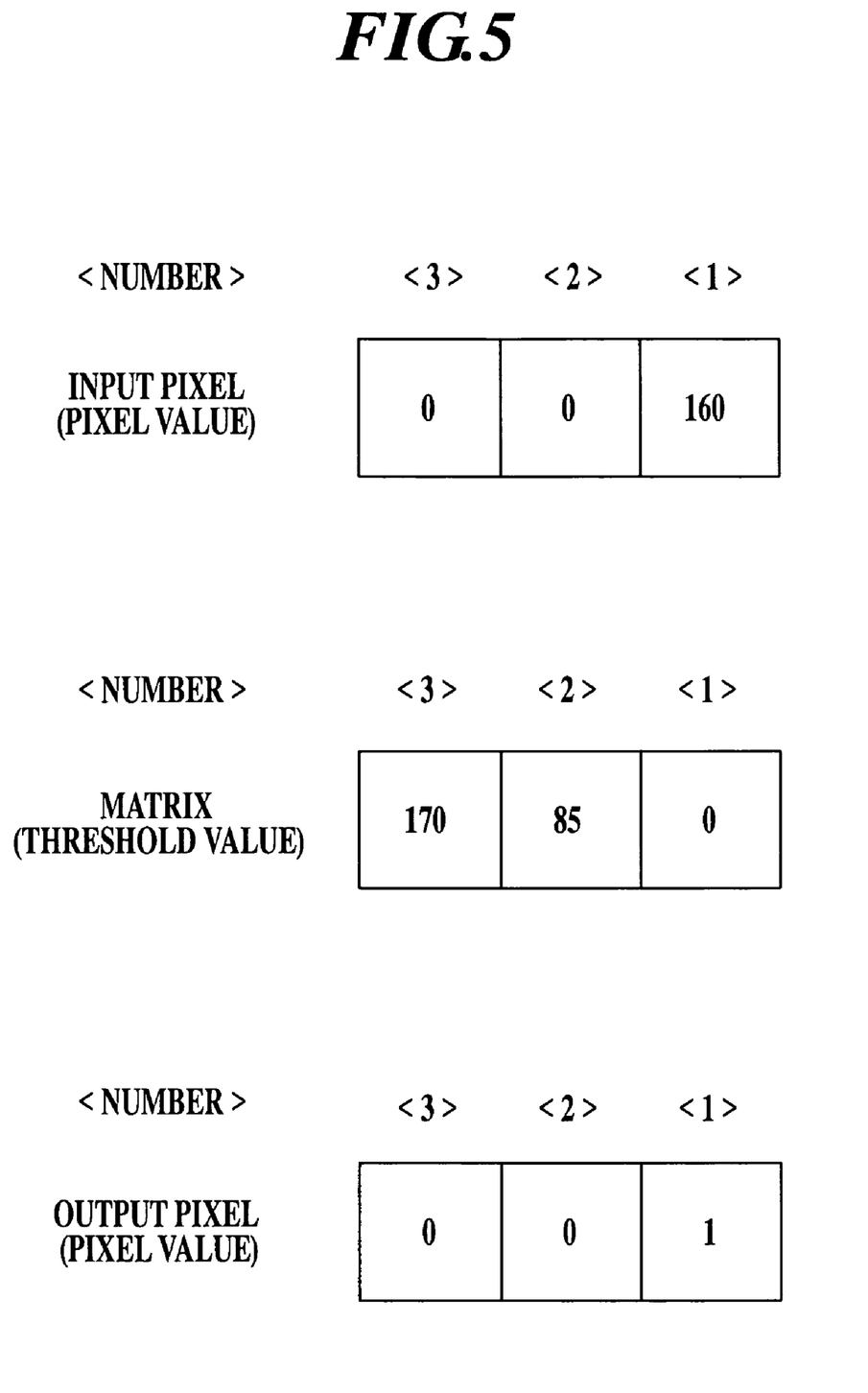
FIG. 5 is a view showing an inputted image and an output image after a screen processing using a matrix.

On the other hand, when TAG is not "2" (Step S2; N) (i.e., when the target pixel group constitutes a character image or a line image), the screen processor 15 numbers the pixels in the target pixel group in descending order of the pixel values (Step S4). For example, when pixels of the referred inputted image are arranged in an order of pixel values of "0", "0", and "160" as shown in FIG. 5, the maximum pixel value is "160" and thus the target pixel "160" is numbered as "1". The remaining two pixels having the same pixel value "0" are arbitrarily numbered as "2" and "3".

Next, the screen processor 15 applies the matrix to the target pixel group.

First, the screen processor 15 decides a matrix to be applied to the target pixel group. The screen processor 15 selects a matrix in which an array of numbers assigned to the target pixel group corresponds to an array of numbers assigned to threshold values of the matrix (Step S5). In case of an example of FIG. 5, the screen processor 15 selects the matrix that has an array of numbers of "321", that is, the array in which the threshold value "170" numbered as "3", the threshold value "85" numbered as "2", and the threshold value "0" numbered as "1" are arranged). The matrix also may be selected in such a manner that the storage unit 3 stores all matrices previously prepared by combining the applied positions of the threshold values and then a suitable matrix is read out based on an array of numbers assigned to threshold values of the matrix. Alternatively, whenever the processing is performed, a matrix also may be prepared by applying threshold values to cells e1 to e3 of a matrix so that an array of numbers assigned to pixel values of a target pixel group corresponds to an array of numbers assigned to threshold values.

The screen processor 15 applies the selected matrix to a target pixel group to carry out the target pixel group (Step S6). Then, the processing is finished. The target pixels are numbered in a descending order of pixel values and the threshold values of the matrix are numbered in an ascending order of threshold values. The matrix is selected so that the arrays of the numbers correspond to each other. Thus, as shown in FIG. 5, the minimum threshold value (a threshold value of "0" in FIG. 5) is always applied to a target pixel having the maximum pixel value (a target pixel having a pixel value of "160" in FIG. 5). Specifically, there is high possibility that the target pixel having the maximum pixel value of "160" result in an output value of "160".

The screen processor 15 shifts an applied position of the matrix in the inputted image, and repeatedly carries out the above processing at the shifted position, until the screen processing is carried out for all pixels of the inputted image.

As described above, according to this embodiment, a matrix in which the minimum threshold value is applied, is selected, and the selected matrix is applied to a target pixel having the maximum pixel value among target pixels. Thus, the maximum pixel value of the target pixel can be retained even when the multilevel operation is carried out for the target pixel. The reproducibility of an original inputted image can be improved. According to this, because in an image including thin lines and the like, a part of the thin lines can be outputted more easily, the image of the thin line can be prevented from being deteriorated, such as thin spot. This embodiment is particularly effective.

Furthermore, the above matrix is selected only in case of TAG=0 or 1, that is, when the image is a character image or a line image. Thus, in particular, a photographic image in which the retention of a thin line and the like is not required, can be prevented from carrying out a screen processing by a selected matrix.

It is noted that the above-described embodiment is a preferable example to which the present invention is applied and the present invention is not limited to this.

For example, although in the description, a case in which a multilevel operation is carried out, is explained, the same processing can be also used in a case in which a binary operation is carried out. In the above description, a relation in which an output value "0" is outputted in case of "threshold value>pixel value" and a pixel value is outputted in case of "threshold value≦pixel value", is explained. However, a screen processing also can be carried out even in an opposite relation in which a pixel value is outputted in case of "threshold value≦pixel value" and an output value "0" is outputted in case of "threshold value>pixel value".

In the above description, it is explained that with respect to a target pixel having the maximum pixel value, a matrix in which the minimum threshold value is applied, is selected. However, with respect to a target pixel having the maximum pixel value, because an output value is an arbitrary value except "0", it is not necessary that the minimum threshold value is always applied. Thus, a pixel value of a target pixel having the maximum pixel value also may be compared with each threshold value of the matrix to select a matrix to which a threshold value smaller than the pixel value of the target pixel is applied. For example, with respect to a target pixel group of (0, 0, 160), not only a matrix to which an array of threshold values (170, 85, 0) is applied, but also a matrix to which an array of threshold values (170, 0, 85) or the like is applied, also can be selected.

In addition, in the above embodiment, a plurality of matrices in which threshold values are previously set to different positions, are provided. However, in another system, only cell elements and threshold values are previously set and during a screen processing, positions of threshold values corresponding to each of the cell elements may be set to each unit region in which a matrix is applied, based on the comparison result in which each pixel value of a plurality of pixels in the unit region are compared with each threshold value thereof. In the example of the matrix of FIG. 3, three threshold values of "0", "85", and "170" are prepared for the three cell elements e1 to e3. When input pixels of "0", "0", and "160" shown in FIG. 5 are inputted, for example, the maximum pixel value in the pixel values is compared with each threshold value. Then, a threshold value which is smaller than the maximum pixel value, is set to a cell element at a position corresponding to the maximum pixel value.

Figure 6:
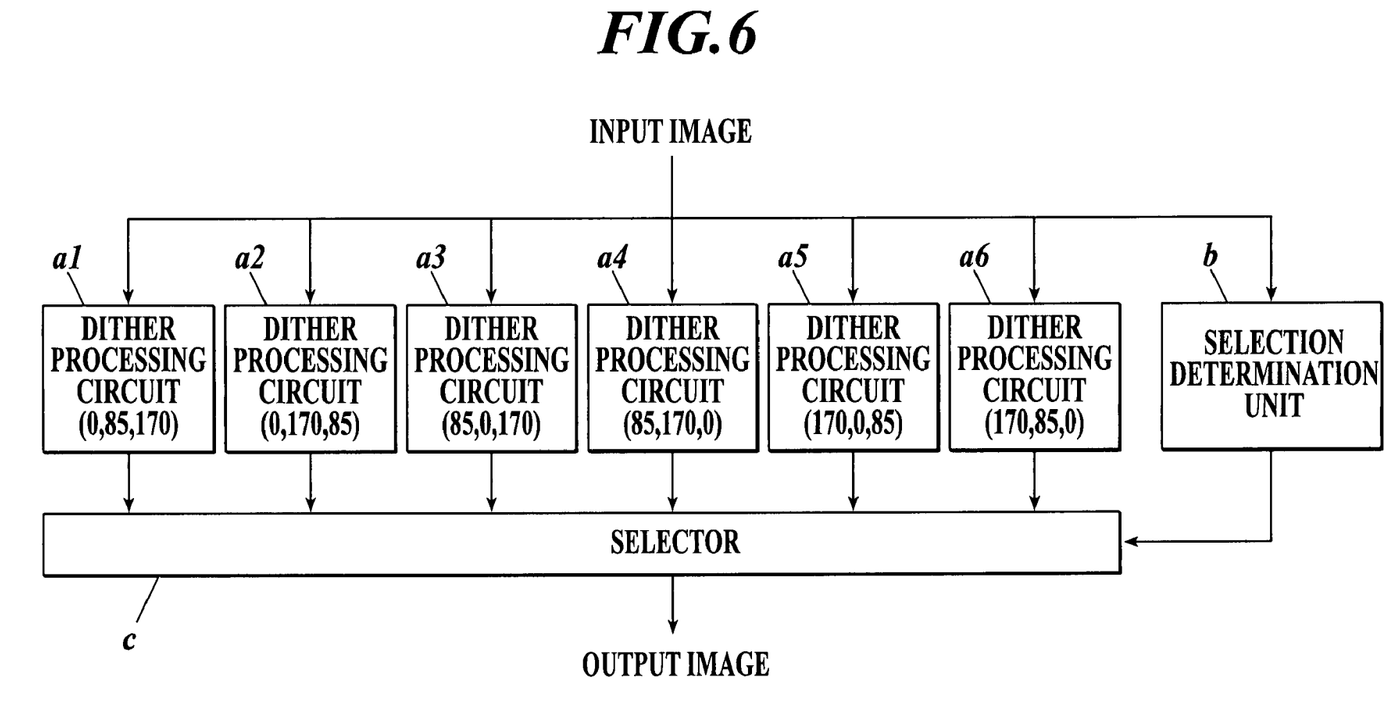
FIG. 6 is a view showing a screen processor in another embodiment.

Although in the above description, an example in which the above processing is realized by a software processing, is explained, the above processing also may be realized by hardware. In this case, the screen processor 15 has a structure as shown in FIG. 6. In the structure as shown in FIG. 6, a plurality of dither processing circuits a1 to a6 are provided so as to correspond to a plurality of matrices in which the each threshold value of "0", "85", and "170" is set to different applied positions. It is noted that arrays in parentheses shown in FIG. 6 (0, 85, 170) and the like show arrays (applied positions) of threshold values in matrices owned by the respective dither processing circuits a1 to a6.

A selection determination unit b is provided. In the selection determination unit b, the attribute data TAG and the pixel values of a target pixel group are referred to determine an output result of any of the dither processing circuits a1 to a6 to be selected, and to generate a select signal. For example, with respect to the target pixel group (0, 0, 160) shown in FIG. 5, a dither processing circuit a6 having a matrix in which a target pixel having the maximum pixel value corresponds to the minimum threshold value, for example, a matrix having an array (170, 85, 0) is selected and a select signal showing that the dither processing circuit a6 is selected, is generated.

A selector c selects an output result of the dither processing circuits a1 to a6 shown by the select signal inputted from the selection determination unit b, among output results inputted from the respective dither processing circuits a1 to a6, to output the result as an output image.

As described above, in case of a hardware configuration, all matrices are firstly applied and a screen processing is carried out to subsequently select an output result. In this point, the hardware processing is different from a software processing in which a matrix is firstly selected to subsequently carry out a dither processing. According to the hardware configuration, because it is possible to determinate of a pixel value and a TAG and carry out a screen processing simultaneously, the processing time can be shortened.

The present U.S. patent application claims the priority of Japanese Patent Application No. 2006-191757 filed on Jul. 12, 2006, according to the Paris Convention, and the above Japanese Patent Application is the basis for correcting mistranslation of the present U.S. patent application.

What is claimed is:

1. An image processing apparatus, comprising:
   an image determination unit for determining an image attribute of each pixel of an inputted image; and
   a screen processor for determining each pixel value of a screen processing application unit region composed of a plurality of pixels to which a threshold matrix is applied in the inputted image,
   wherein the screen processor carries out a screen processing by applying one threshold matrix among a plurality of threshold matrices in which applied positions of threshold values are different from each other to the plurality of pixels in the screen processing application unit region based on the determined attribute and each determined pixel value,
   wherein the screen processor compares each determined pixel value with each threshold value of the threshold matrix, and selects one threshold matrix from among the plurality of threshold matrices based on a comparison result to apply the selected threshold matrix to the screen processing, and
   wherein the screen processor selects a threshold matrix in which each threshold value is applied in an ascending order of the threshold values to the pixels in a descending order of the determined pixel values, based on the comparison result.

2. The image processing apparatus of claim 1, wherein the screen processor selects a threshold matrix in which a threshold value smaller than a maximum determined pixel value is applied to a pixel having the maximum determined pixel value, based on the comparison result.

3. The image processing apparatus of claim 1, wherein the attribute is one of a photographic image and a character/line image.

4. An image processing apparatus, comprising:
   an image determination unit for determining an image attribute of each pixel of an inputted image; and
   a screen processor which determines pixel values within a unit region of the inputted image, the unit region being composed of a plurality of pixels to which a screen threshold matrix is applied,
   wherein the screen processor carries out a screen processing by applying one of a plurality of screen threshold matrices to the plurality of pixels in the unit region based on the determined attribute and each determined pixel value, the plurality of screen threshold matrices being different in applied positions of the threshold values from each other,
   wherein the screen processor compares each determined pixel value with each threshold value of the screen threshold matrix, and selects one threshold matrix from among the plurality of screen threshold matrices based on a comparison result to apply the selected screen threshold matrix to the screen processing, and
   wherein the screen processor selects one of the screen threshold matrices in which each threshold value is applied in an ascending order of the threshold values to the pixels in a descending order of the determined pixel values, based on the comparison result.

5. The image processing apparatus of claim 4, wherein the screen processor selects one of the screen threshold matrices in which a threshold value smaller than a maximum determined pixel value is applied to a pixel having the maximum determined pixel value, based on the comparison result.

6. The image processing apparatus of claim 4, wherein the attribute is one of a photographic image and a character/line image.

* * * * *